United States Patent
Colinet et al.

[15] 3,693,532
[45] Sept. 26, 1972

[54] HEATING AND VENTILATING SYSTEM FOR VEHICLES

[72] Inventors: André Colinet; Jacques Mercier, both of Billancourt, France

[73] Assignees: Regie Nationale des Usines Renault, Billancourt; Automobiles Peugeot, Paris, France

[22] Filed: Oct. 26, 1970

[21] Appl. No.: 84,070

[52] U.S. Cl. ................................. 98/2.07, 98/2.08
[51] Int. Cl. ............................................. B60h 1/24
[58] Field of Search ............ 98/2.06, 2.07, 2.08, 2.09, 98/2.1

[56] References Cited

UNITED STATES PATENTS

| | | | |
|---|---|---|---|
| 2,860,567 | 11/1958 | Wilfert | 98/2.06 |
| 3,326,110 | 6/1967 | Orr | 98/2.07 |
| 2,738,718 | 3/1956 | Reynolds | 98/2.07 |
| 3,387,549 | 6/1968 | De Castelet | 98/2.07 |

Primary Examiner—Meyer Perlin
Attorney—Stevens, Davis, Miller & Mosher

[57] ABSTRACT

This heating and ventilating system is adapted to deliver air in sheet form and comprises an upper hollow inlet beam associated with a helical fan and motor unit, an upper beam for de-misting and a lower beam for distributing air, which extend throughout the width of the vehicle, a casing comprising a pressurizing chamber, a heat exchanger, a mixing chamber equipped with shutters for controlling the ingress of reheated air, the opening of one of these last-named shutters being operatively connected to the inlet means for warm water from said exchanger and, in conjunction with the opening of the other shutter, a rheostat for starting said fan and motor unit.

6 Claims, 5 Drawing Figures

PATENTED SEP 26 1972 3,693,532
SHEET 2 OF 2
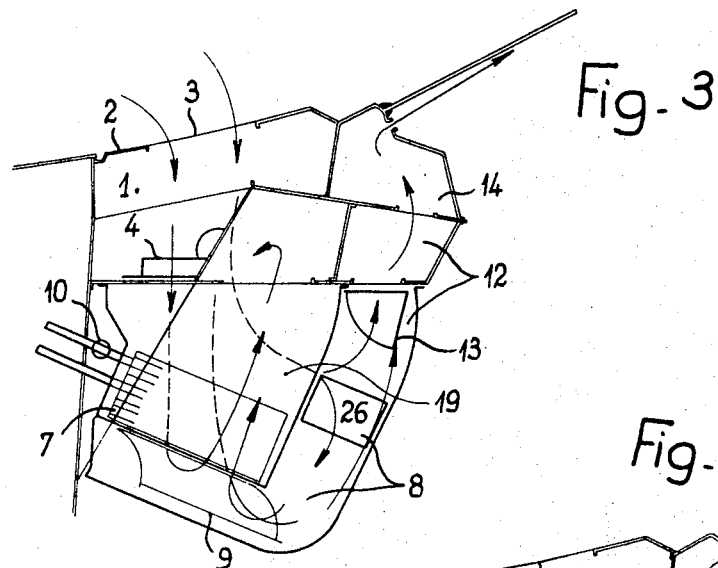
Fig. 3
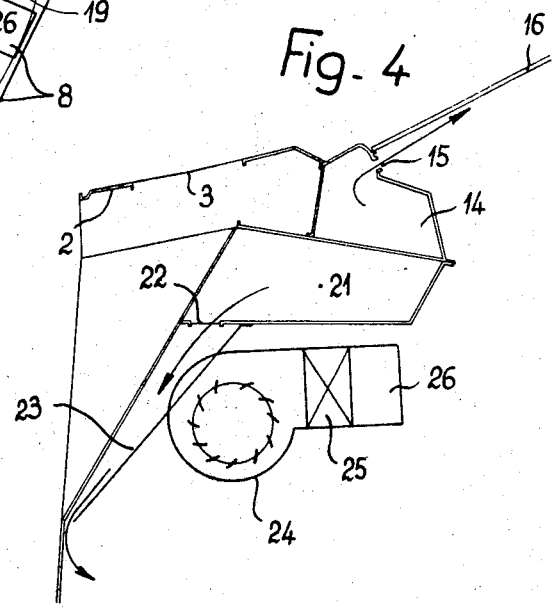
Fig. 4
Fig. 5
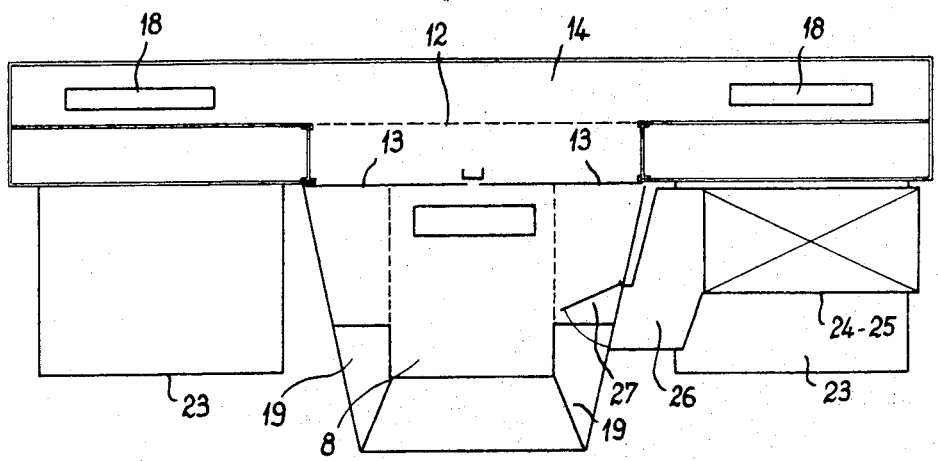

HEATING AND VENTILATING SYSTEM FOR VEHICLES

The present invention relates in general to heating and ventilating systems of automotive vehicles and has specific reference to an air-conditioning system intended for motor vehicles and adapted to create an air circulation in the form of sheets spread throughout the width of a passengers'space, notably in motor vehicles, by using a compact air-mixing apparatus specially designed for this purpose.

For obtaining the proper air conditioning in the interior of an automobile powered by a water-cooled internal combustion engine, apparatus based on various principles are used according to the type and characteristics of the vehicle to be equipped.

It is also known to use a heating casing comprising a compact assembly consisting of an air inlet, a motor-driven fan, a heat exchanger and outlet means for delivering the heating or fresh air into the car interior, the temperature of the air carried by the fan to the car interior being adjusted with the assistance of a valve controlling the water output through the heat exchanger and/or of a mixing shutter providing the desired variable proportions of air heated in said exchanger and air taken from the external atmosphere.

Heating and ventilating systems are also known which ensure a "sheet"-like air circulation in the car interior or driver's cabin, these system utilizing to this end the hollow beams of the vehicle frame structure as convenient means for distributing air through outlet orifices disposed along the entire width of the vehicle. Upstream of these distributing beams are the heat exchanger and the motor-driven fan. These two elements may be designed either in the form of separate elements incorporated in the frame structure of the vehicle, in which case the heat exchanger consists of a relatively long radiator, or heat is reconcentrated in a box or casing, in which the heat exchanger is of compact design. In both cases the temperature is adjusted by actuating a valve regulating the water output.

It is the primary object of the present invention to provide a heating and ventilating system, notably for automotive vehicles, which comprises an air circulation system adapted to distribute the air in sheet form by means of an assembly of a beam forming part of the frame or body structure of the vehicle, associated with a compact air-mixing apparatus specially designed for this purpose.

Other features and advantages of this invention will appear as the following description proceeds with reference to the attached drawings given by way of illustration only and wherein :

FIG. 3 is a section taken along the line III—III of FIG. 1, corresponding to the axis of a lateral duct of the casing, in order to show the distributing circuit directed to the passengers'legs ;

FIG. 4 is another section taken along the line IV—IV of FIG. 1, on the passenger's side, showing the distribution of warm air to the passengers'legs and the mounting of the air-conditioning device, and FIG. 5 is a view taken from inside the vehicle and showing the air conditioning device and the distribution through the heating casing.

Figure 1:
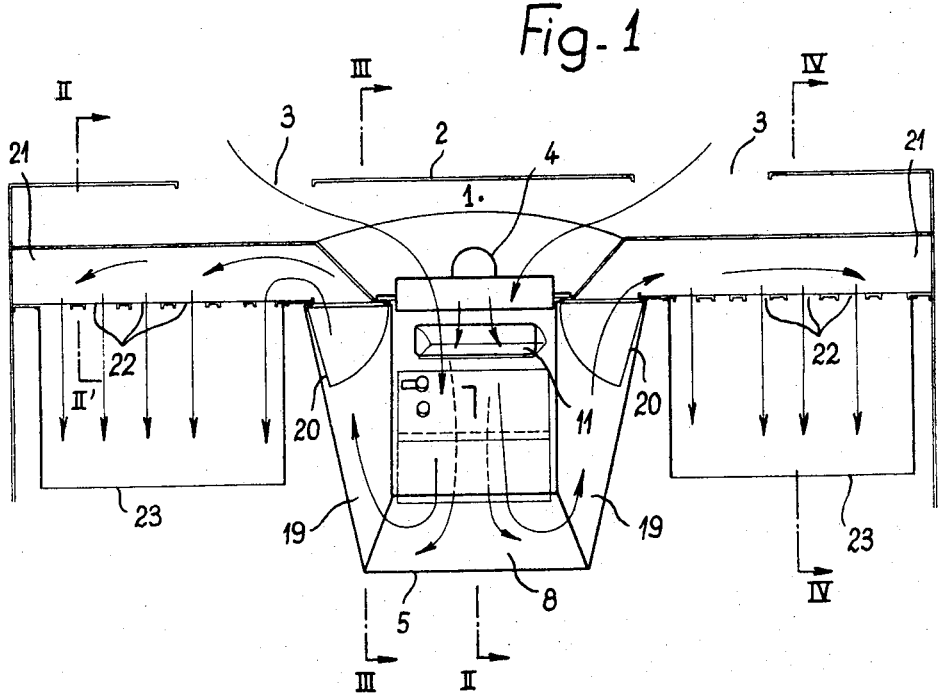
FIG. 1 is a general diagrammatic view of the heating system as seen from the interior of the vehicle.
Figure 2:
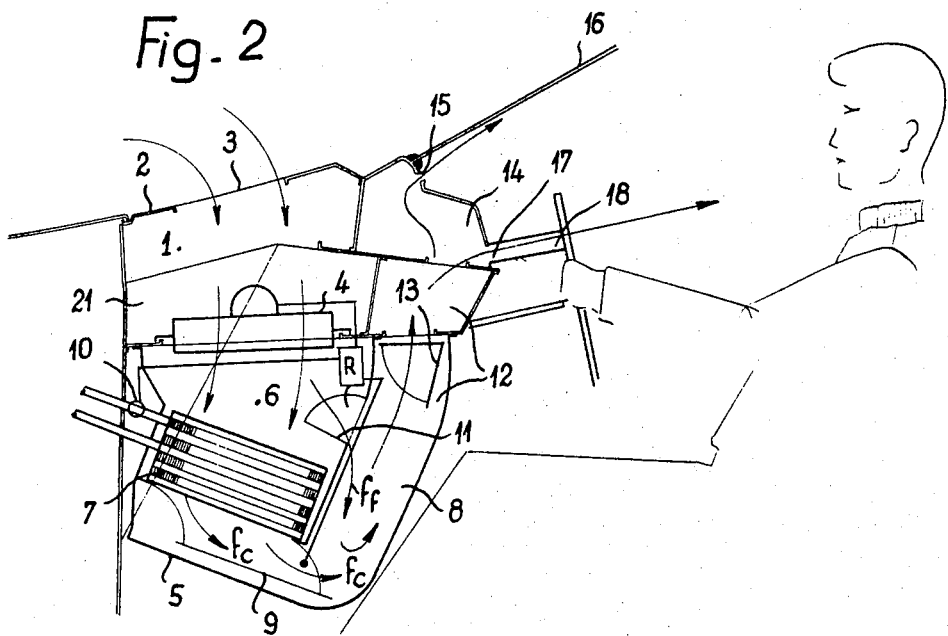
FIG. 2 is a section taken along the line II—II of FIG. 1, along the axis of the device and across an air outlet, in order to illustrate the air inlet circuit and air distributing or outlet circuit leading to the de-misting and ventilating system.

Referring to the drawings, the heating and ventilating system according to this invention comprises a hollow air-inlet beam 1 closed by a bonnet 2 formed with air inlet apertures 3 located at the bottom of the windscreen in a zone of pressurized air due to the relative wind, a fan-type motor and ventilating unit 4 disposed in the bottom of said hollow beam 1 and easily accessible by simply opening the bonnet 2, an inner casing 5 comprising as shown in FIGS. 2 and 3 a pressurizing chamber 6, a heat exchanger 7 connected to the engine cooling system, a mixing chamber 8 receiving on one side air reheated as shown by the arrows $f_c$ from the heat exchanger 7 and on the opposite side air at the surrounding temperature as shown by the arrows $f_f$ directly from the pressurizing chamber 6. The opening of the shutter 9 controlling the delivery of reheated air, which is coupled to the valve 10 controlling the ingress of warm water into the heat exchanger 7, and the opening of the atmospheric air inlet shutter 11, which are both operatively connected to the rheostat R for starting the motor-fan 4, are adapted to produce in chamber 8 an air mixture corresponding to the user's requirements.

The mixing chamber 8 is connected :

1. via a central duct 12 adapted to be closed by means of a shutter 13 to a hollow beam 14 extending throughout the width of the vehicle and formed at its upper portion with orifices 15 for distributing air directed to the lower portion of the windscreen 16 for de-misting, de-icing and ventilating same by means of sheet-forming air jets. This beam 14 comprises on its rear face a plurality of outlet ducts 17 leading to air outlets 18 extending from or not along said beam, directed towards the driver and passenger(s) and adjustable from the dual point of view of output and direction.

2. via a pair of side ducts 19 adapted to be closed by means of shutters 20 to another hollow beam 21 underlying the first one 14 and also extending throughout the width of the vehicle; this other hollow beam has formed in its lower portion a plurality of apertures 22 adapted to deliver air into ducts 23 directed towards the floor of the vehicle for heating or ventilating the passengers'legs.

The shutters 13 and 20 may be operatively interconnected to permit the distribution of air outputs towards said beams 14 and 21, shutters 13 opening when the shutters 20 are being closed, and vice-versa. On the other hand, the inlet end of duct 12 supplying air to the upper beam 14 is located in the vicinity of the shutter 11 controlling the supply of atmospheric air, and the inlet apertures of the pair of lateral ducts 19 delivering air to the lower beam 21 are located in the vicinity of the shutter 9 controlling the supply of reheated air, said lateral ducts creating the temperature differential between the upper and lower layers of conditioned air, thus meeting the physiological requirement of obtaining a higher temperature at the feet than at the head, all the more when it is desired to reduce the heating.

The distributing circuit may also be used when the mounting of an air-conditioning system is contemplated. The assembly comprising the motor and fan unit 24 and the evaporator 25 is connected through a duct 26 to the mixing chamber 8 of the heating casing 5. With the shutters 11 and 9 controlling the ingress of external air in their closed position, the distribution of cooled air may be directed through the central duct 12, the beam 14 and air-outlets 18 towards the roof of the passengers' compartment, and through the ducts 19, beam 21 and ducts 25 towards the lower portion of said compartment. The duct 26 may be provided with valve means 27 (FIG. 5) to prevent the return of air towards the evaporator, when the heating system alone is operated, the opening of said valve means 27 being responsive, if desired, to the aforesaid rheostat R provided for starting the air-conditioning motor and fan unit 24.

Although a few specific forms of embodiment of the present invention have been shown and described herein, it will readily occur to those conversant with the art that various modifications and variations may be brought thereto without departing from the basic principles of the invention as set forth in the appended claims.

What is claimed as new is:

1. A heating and ventilating system for providing an air circulation in vehicles in the form of sheets spread throughout the width of the vehicle by using an assembly of hollow frame-structure beams associated with a compact air-mixing apparatus, comprising: a first air inlet hollow beam closed by a bonnet formed with air inlet holes disposed at the base of the windscreen in a zone of pressurized air due to the relative wind; a helical-type motor and fan unit disposed in the lower portion of the air inlet beam and easily accessible by simply opening said bonnet and cooperating with a rheostat controlling the start and speed of the motor; an inner casing comprising a pressurizing chamber; a heat-exchanger of the warm water inlet type connected to the engine cooling system; a mixing chamber supplied through inlet shutters on the one side with air reheated through the heat exchanger and on the opposite side with external air at the atmospheric temperature, taken directly from said pressurizing chamber, the opening of the reheated air delivery shutter being operatively connected to the means supplying warm water to said heat exchanger, and the opening of the atmospheric air inlet shutter being jointly with said reheated air shutter operatively connected to said motor start rheostat, thus ensuring the desired air mixing in said mixing chamber.

2. A heating and ventilating system according to claim 1, wherein said mixing chamber is connected at one hand via a central duct adapted to be closed by a shutter to another beam extending throughout the width of the vehicle and formed in its upper portion with orifices adapted to direct air towards the lower portion of the windscreen for de-misting, de-icing and sheet ventilating same, and comprising on its rear face outlets connnected to air outlets directed towards the passengers of the vehicle and adjustable from the dual point of output and direction, and on the other hand by ducts adapted to be closed by shutters, to a second beam also extending throughout the width of the vehicle and underlying said first beam for de-misting and aerating the upper portion of the passengers' compartment, said second beam being formed at its lower portion with orifices for distributing air to ducts means directed towards the floor of the vehicle for heating and ventilating the legs of the passengers.

3. Heating and ventilating system according to claim 2, wherein the inlet end of said duct supplying air to said first or upper beam is located in the vicinity of the inlet receiving the surrounding air, and that the inlets of said lateral ducts supplying air to said lower beam are located in the vicinity of the reheated air inlet.

4. Heating and ventilating system according to claim 3, wherein said shutters of the upper and lower beams are operatively interconnected.

5. Heating and ventilating system according to claim 4, wherein an air-conditioning apparatus is connected to said mixing chamber and utilizes the same distributing circuit.

6. A heating and ventilating system for vehicles comprising:
an exterior air inlet comprising a hollow beam closed by a bonnet on the exterior of the vehicle, said bonnet having inlet apertures therein;
an inner casing enclosing a pressurizing chamber;
a motor driven helical fan in the lower portion of the inlet beam, said fan for moving air into said pressurizing chamber;
a liquid-gas heat exchanger in the pressurizing chamber;
a mixing chamber downstream of the pressurizing chamber, and one inlet shutter from the pressurizing chamber to the mixing chamber located downstream of the heat exchanger, and another inlet shutter from the pressurizing chamber to the mixing chamber located upstream of the heat exchanger;
means for supplying warm fluid to the heat exchanger, including an inlet valve;
a rheostat control means for coordinating said inlet valve, the upstream and downstream inlet shutters, and the fan motor; and
a central duct connecting said mixing chamber and a hollow beam extending across the interior of the vehicle, having exit apertures for distributing a thin stream of air throughout the width of the vehicle.

* * * * *

UNITED STATES PATENT OFFICE
CERTIFICATE OF CORRECTION

Patent No. 3,693,532     Dated September 26, 1972

Inventor(s) Andre COLINET et al

It is certified that error appears in the above-identified patent and that said Letters Patent are hereby corrected as shown below:

Letters Patent will show the French Priority No. 69/37 937 filed November 4, 1969

Signed and sealed this 13th day of February 1973.

(SEAL)
Attest:

EDWARD M. FLETCHER, JR.  
Attesting Officer

ROBERT GOTTSCHALK  
Commissioner of Patents